(12) United States Patent
Sakaguchi et al.

(10) Patent No.: US 8,977,462 B2
(45) Date of Patent: Mar. 10, 2015

(54) ACCELERATOR PEDAL DEPRESSION FORCE SETTING METHOD FOR ACCELERATOR PEDAL DEPRESSION FORCE CONTROL DEVICE

(75) Inventors: Shigeyuki Sakaguchi, Yokohama (JP); Masao Shiomi, Sagamihara (JP); Hisashi Kawade, Hiratsuka (JP); Hiromutsu Touhachi, Yamato (JP); Masahiro Omori, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 57 days.

(21) Appl. No.: 13/703,501

(22) PCT Filed: May 6, 2011

(86) PCT No.: PCT/JP2011/060594
§ 371 (c)(1),
(2), (4) Date: Dec. 11, 2012

(87) PCT Pub. No.: WO2011/158571
PCT Pub. Date: Dec. 22, 2011

(65) Prior Publication Data
US 2013/0118295 A1    May 16, 2013

(30) Foreign Application Priority Data

Jun. 15, 2010   (JP) .................................. 2010-135653

(51) Int. Cl.
*G06F 19/00*   (2011.01)
*G05G 1/40*    (2008.04)
*B60K 26/02*   (2006.01)
*F02D 11/04*   (2006.01)
*G05G 1/30*    (2008.04)

(52) U.S. Cl.
CPC ................ *G05G 1/40* (2013.01); *B60K 26/021* (2013.01); *F02D 11/04* (2013.01); *G05G 1/30* (2013.01); *F02D 2200/0404* (2013.01); *F02D 2200/602* (2013.01)
USPC .............................................. 701/70; 74/513

(58) Field of Classification Search
None
See application file for complete search history.

(56) References Cited

U.S. PATENT DOCUMENTS 6,542,793 B2 * 4/2003 Kojima et al. .................... 701/1
8,321,111 B2   11/2012 Ueno et al.
(Continued)

FOREIGN PATENT DOCUMENTS

JP   2003-120339 A   4/2003
JP   2006-283561 A   10/2006
(Continued)

*Primary Examiner* — Helal A Algahaim
*Assistant Examiner* — Kelly E Darby
(74) *Attorney, Agent, or Firm* — Foley & Lardner LLP

(57) ABSTRACT

When a depression force of an accelerator pedal is increased than a base depression force by a predetermined increase amount when an accelerator opening degree becomes greater than an accelerator opening degree threshold value, an overshoot control is performed so that a depression force increase command is once increased than a depression force increase target command value which increases the depression force of the accelerator pedal than the base depression force by the predetermined amount, and returned to the depression force increase target command value. In this overshoot control, an overshoot controlled variable of the overshoot control is set based on a magnitude of a hysteresis of the base depression force of the accelerator pedal.

11 Claims, 6 Drawing Sheets

(56) References Cited

U.S. PATENT DOCUMENTS

2006/0231074 A1* 10/2006 Ueno et al. .................. 123/399
2012/0006145 A1   1/2012 Hotta et al.

FOREIGN PATENT DOCUMENTS

JP          2010-211581 A       9/2010
WO     WO 2010013125 A1 *   2/2010   .............. F02D 11/04

* cited by examiner

1 — VEHICLE BODY
2 — ACCELERATOR PEDAL
3 — ROTATION SHAFT
4 — RETURN SPRING
5 — BEARING
6 — ACCELERATOR POSITION SENSOR
7 — VARIABLE FRICTION PLATE
7a — FRICTION MEMBER
7b — FRICTION MEMBER
8 — FIXED SHAFT
9 — ACTUATOR
10 — CONTROL UNIT

ACCELERATOR PEDAL DEPRESSION FORCE SETTING METHOD FOR ACCELERATOR PEDAL DEPRESSION FORCE CONTROL DEVICE

CROSS-REFERENCE TO RELATED PATENT APPLICATIONS

Japan Priority Application 2010-135653, filed Jun. 15, 2010 including the specification, drawings, claims and abstract, is incorporated herein by reference in its entirety.

TECHNICAL FIELD

This invention relates to an accelerator pedal depression force setting method for an accelerator pedal depression force control device.

BACKGROUND ART

Patent Document 1 discloses an engine arranged to switch between a first driving method (for example, homogeneous combustion) on a high rotation and high load side, and a second driving method (for example, stratified charge combustion) on a low rotation and low load side on which a fuel economy efficiency is higher than that of the first driving method. A depression force control device according to Patent Document 1 is configured to immediately increase a depression reaction force (depression force) of an accelerator pedal when a driving region of the engine enters a boundary driving region just before switching to a first driving region when the driving region of the engine is switched from a second driving region in which the second driving method is performed to the first driving region in which the first driving method is performed. The increase amount of the depression force is canceled when the driving region of the engine is returned from the boundary driving region to the second driving region.

The device according to Patent Document 1 is configured to increase the depression force of the accelerator pedal. The device is further configured to release the increase amount by using, as a boundary, the above-described boundary driving region for decreasing the fuel consumption rate. The accelerator pedal is a main operation member for driving the vehicle as intended by the driver. An operation feeling which the driver experiences and the operational effects with respect to a feeling of drivability of the vehicle are very important for assessment of the quality of the entire vehicle. In the practical application of such a device, which may contribute to the decrease of the fuel economy, it is necessary to balance the fuel economy reduction and the operability of the accelerator pedal or the operability of the vehicle at a high level.

For example, if the depression force control device is structured such that the depression force of the accelerator pedal can be varied by driving an actuator, it is conceivable that the control is performed so that a driving command value to this actuator is set to be once increased to be more than a target value, and to be returned to the target value. Thus, the driver feels the sudden increase of the depression force which is performed when the driving region enters from the second driving region to the boundary driving region when the driver depresses the accelerator pedal so as to improve the response of the depression force increase.

However, there may also be other cases in which the control is performed so that the driving command value to the actuator is set to be once increased to be more than the target value, and to be returned to the target value. In such cases, if the controlled variable of the driving command value with respect to the target value is not appropriately set, the depression force of the accelerator pedal becomes excessively large. Consequently, there is a problem that the operability of the accelerator pedal is deteriorated.

PRIOR ART DOCUMENT

Patent Document

Patent Document 1: Japanese Patent Application Publication No. 2003-120339

SUMMARY OF THE INVENTION

In the present invention, an accelerator pedal depression force setting method is provided for an accelerator pedal depression force control device configured to perform an overshoot control to once increase an depression force increase command to be more than a depression force increase target command value. The overshoot control thus increases a depression force of an accelerator pedal to be more than a base depression force when the depression force of the accelerator pedal is increased to be more than the base depression force, and then to return to the depression force increase target command value. The accelerator pedal depression force setting method comprises: controlling the base depression force of the accelerator pedal having a hysteresis which has different values in an opening degree increase direction and in an opening degree decrease direction of an accelerator opening degree, and setting an overshoot controlled variable of the overshoot control based on the hysteresis.

In the present invention, the overshoot controlled variable is set based on the magnitude of the hysteresis of the base depression force of the accelerator pedal. Accordingly, it is possible to appropriately set the overshoot controlled variable. In this manner, it is possible to improve the response of the depression force increase when the depression force of the accelerator pedal is increased to be more than the base depression force, and to prevent the deterioration of the operability of the accelerator pedal.

BRIEF DESCRIPTION OF DRAWINGS

FIG. 6(*a*) shows a variation of the accelerator opening degree. FIG. 6(*b*) shows a variation of the depression force command. FIG. 6(c) shows a variation of the accelerator pedal depression force.

FIG. 7(a) shows a variation of the accelerator opening degree. FIG. 7(b) shows a variation of the depression force increase command. FIG. 7(c) shows a variation of the depression force of the accelerator pedal.

DESCRIPTION OF EMBODIMENTS

Hereinafter, one embodiment of the present invention will be illustrated in detail with reference to the drawings.

This accelerator pedal depression force control device is basically configured to variably control a depression force (operation reaction force) of an accelerator pedal 2 provided to a vehicle body 1 of a vehicle (not shown). As described below, the accelerator pedal depression force control device includes a means configured to sense an opening degree (depression amount) of the accelerator pedal 2 provided to the vehicle, and a means configured to vary the depression force of the accelerator pedal 2 from a base depression force. The accelerator pedal depression force control device is configured to increase the depression force of the accelerator pedal 2 to be more than (beyond) the base depression force in a region where the opening degree of the accelerator pedal 2 is greater than a predetermined accelerator pedal opening degree threshold value.

Figure 1:
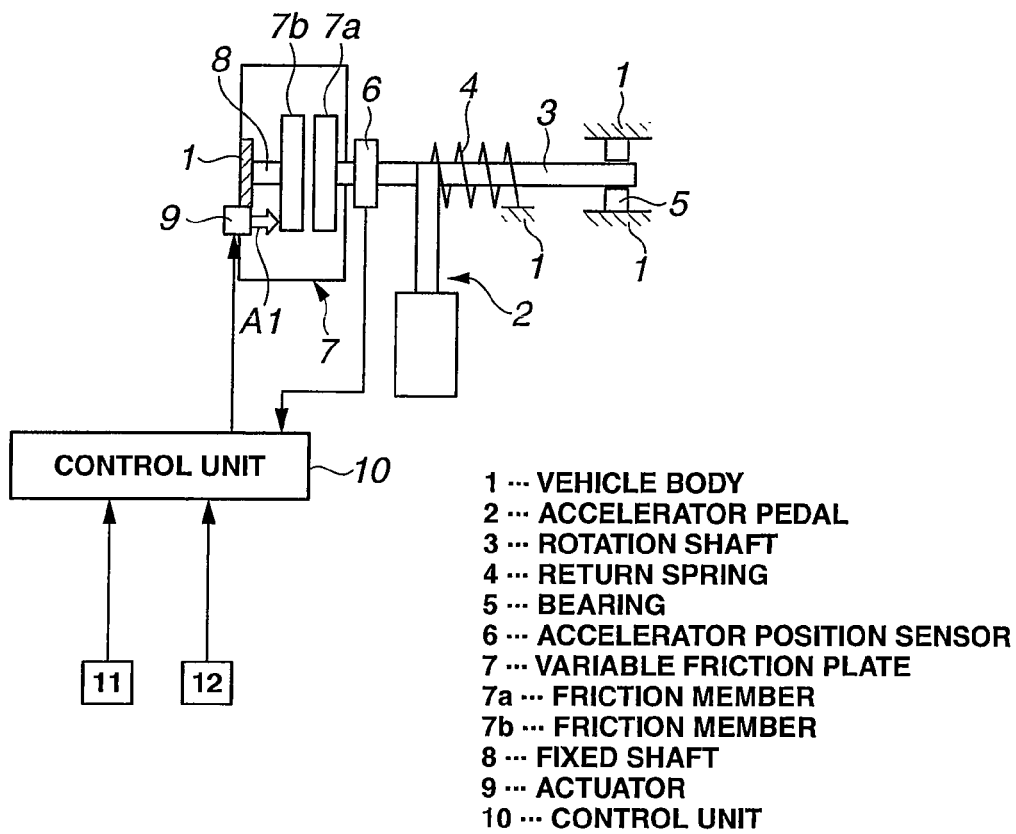
FIG. 1 is an explanatory view schematically showing a system configuration of an accelerator pedal depression force control device according to the present invention, and a schematic configuration of a depression force varying mechanism.
Figure 2:
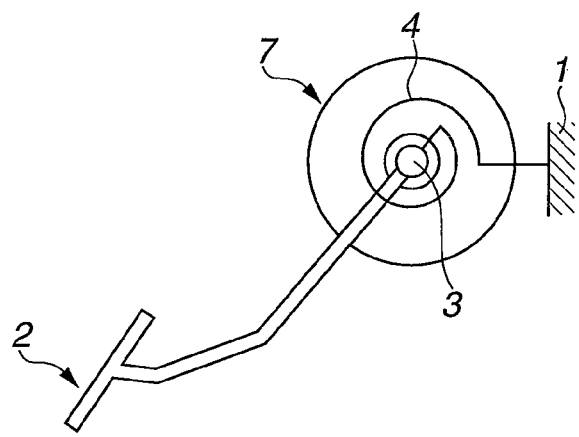
FIG. 2 is an explanatory view schematically showing the depression force varying mechanism according to the one embodiment of the present invention.

As shown in FIGS. 1 and 2, the accelerator pedal 2 is provided on a rotation shaft 3. The accelerator pedal 2 is arranged to be swung about the rotation shaft 3. The accelerator pedal 2 receives a reaction force in an accelerator closing direction by a return spring 4 which may have various shapes, and which has one end fixed to the vehicle body 1, and the other end fixed to the rotation shaft 3. Moreover, one end of the rotation shaft 3 is rotatably supported by the vehicle body 1 through a bearing 5. On the other hand, an accelerator position sensor 6 serving as an accelerator opening degree sensing means is provided near the other end of the rotation shaft 3.

In this embodiment, the depression amount of the accelerator pedal 2 (the accelerator opening degree) and an opening degree of a throttle valve (not shown) of an internal combustion engine (not shown) are coordinated with each other. The opening degree of the throttle valve of the internal combustion engine is increased in accordance with the depression amount of the accelerator pedal 2. That is, a fuel injection amount (and then a fuel consumption amount) is increased in accordance with the accelerator opening degree.

The depression force varying mechanism is constituted by a variable friction plate 7 including a pair of friction members 7a and 7b which confront each other, and which are arranged to provide the frictional force to the rotation of the rotation shaft 3. One friction member 7a is mechanically connected to an end portion of the rotation shaft 3. The other friction member 7b is supported through splines and so on to a fixed shaft 8 so as to be moved in an axial direction, and so as not to be rotated. The fixed shaft 8 is fixed to and supported by the vehicle body 1. Moreover, an actuator (for example, an electromagnetic solenoid) 9 arranged to urge the friction member 7b toward the friction member 7a is fixed to the vehicle body 1.

The variable friction plate 7 moves the friction member 7b in the axial direction (in a direction of an arrow A1 in FIG. 1) by the actuation of the actuator 9. With this, the variable friction plate 7 variably controls the friction force between the friction member 7a and the friction member 7b. This actuation of the actuator 9 is controlled by a control unit 10. Accordingly, it is possible to vary the friction force applied to the rotation shaft 3, and then the depression force at the depression of the accelerator pedal 2, by controlling the actuation of the actuator 9 via the control unit 10.

The control unit 10 receives signals from various sensors such as the above-described accelerator position sensor 6 arranged to sense the opening degree of the accelerator pedal 2, an engine speed sensor 11 arranged to sense an engine speed Ne, and a vehicle speed sensor 12 arranged to sense a vehicle speed VSP.

Figure 3:
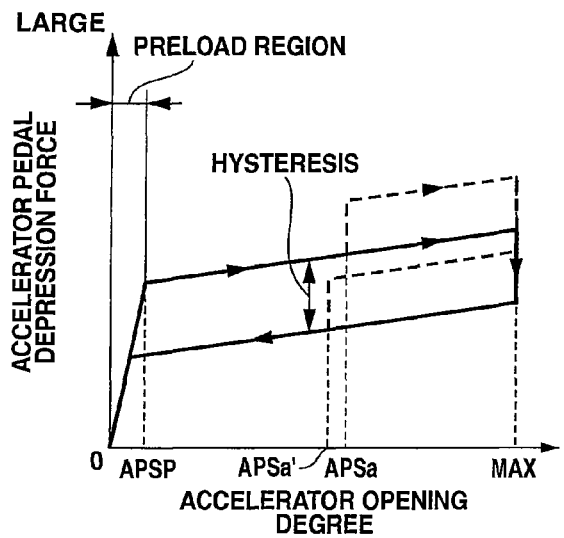
FIG. 3 is a characteristic view showing an example of a characteristic of an accelerator pedal depression force in the present invention.

FIG. 3 schematically shows a characteristic of the depression force of the accelerator pedal in the above-described embodiment. A basic depression force, that is, a base depression force, is increased to be substantially proportional to the accelerator opening degree while having an appropriate hysteresis in the opening degree increasing direction and in the opening degree decreasing direction. Moreover, an initial region (preload region) in which the base depression force is suddenly increased is set in a small accelerator opening degree region. Besides, the hysteresis of the base depression force of the accelerator pedal 2 is set to a substantially constant value, irrespective of the magnitude of the accelerator opening degree.

As described in detail below, the base depression force is proportionally increased in the increasing direction of the accelerator opening degree from a predetermined minute opening degree (an accelerator opening degree APSP) to a maximum opening degree (an accelerator opening degree MAX). The initial region in which the accelerator opening degree is between zero and the minute opening degree is the preload region in which the base depression force is increased at a relatively large rate, in accordance with the increase of the accelerator opening degree.

When the accelerator opening degree is greater than the predetermined accelerator opening degree threshold value (APSa) at the operation in the opening degree increasing direction, that is, at the depression, the accelerator depression force is increased to be more than the base depression force in the stepped manner, as shown by a broken line.

In this case, the accelerator opening degree threshold value (APSa) is a value relating to a fuel consumption rate (the accelerator opening degree at which the driving state is switched from the driving state in which the fuel consumption rate is low, to the driving state in which the fuel consumption rate is high). The accelerator opening degree threshold value is set by the control unit 10 based on the driving state of the vehicle or the engine. In this way, the further depression of the accelerator pedal 2 by the driver is naturally suppressed by increasing the depression force of the accelerator pedal in the stepped manner. At the same time, it is possible to surely inform the driver of the transition from the driving state in which the fuel consumption rate is low (that is, the fuel economy is good), to the driving state in which the fuel consumption rate is high (that is, the fuel economy is bad).

The control unit 10 sets the above-described accelerator opening degree threshold value (APSa), and sets the predetermined increase amount cancel threshold value (APSa') as the depression force increase cancel condition (condition for canceling the depression force increase). When the accelerator opening degree becomes greater than the accelerator opening degree threshold value (APSa), the control unit 10 adds the predetermined depression force increase amount to the base depression force of the accelerator pedal 2. Moreover, when the accelerator opening degree becomes equal to or smaller than the above-described increase amount cancel threshold value (APSa') in a state where the predetermined depression force increase amount is added, it is deemed that the depression force increase cancel condition is satisfied. Accordingly, the control unit 10 eliminates the predetermined depression force increase amount which is added to the base depression force of the accelerator pedal 2.

In this case, the increase amount cancel threshold value (APSa') is set as the accelerator opening degree smaller than the accelerator opening degree threshold value (APSa) in the same driving state of the vehicle or the engine. For example, the increase amount cancel threshold value (APSa') is set to have a difference of a constant opening degree (a constant opening degree difference) with respect to the accelerator opening degree threshold value (APSa).

For example, the accelerator opening degree threshold value is set in accordance with an engagement and a disengagement of a lockup clutch (not shown) of an automatic transmission of a torque converter type. To explain with reference to FIG. 4, as is well known, this lockup clutch is a mechanism directly connecting an input side and an output side of a torque converter. This lockup clutch is controlled to be switched to engage or disengage based on the vehicle speed VSP and the accelerator opening degree APS. This lockup clutch becomes in the disengaged state in a non-lockup (non-L/U) region (a region shown by hatched lines in FIG. 4) in which the accelerator opening degree APS is large in the low vehicle speed side. This lockup clutch becomes in the engaged state in a lockup (L/U) region in which the accelerator opening degree APS is small in the high vehicle speed side. In this case, the fuel consumption rate is relatively deteriorated in the state where the lockup clutch is disengaged, relative to the state where the lockup clutch is engaged. Accordingly, in the case of this example, the non-lockup region is considered to be the driving state region of the high fuel consumption rate, and the lockup region is considered to be the driving state region of the low fuel consumption rate. When the accelerator opening degree APS is increased from the lockup region to the non-lockup region, the depression force of the accelerator pedal is increased.

Figure 4:
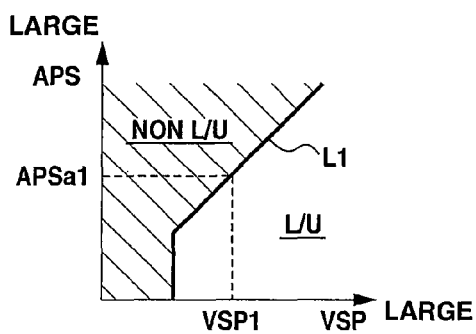
FIG. 4 is an explanatory view showing one example of correlation between an accelerator opening degree threshold value and a lockup region of a lockup clutch.

In this case, the control unit 10 judges whether the lockup clutch is in the disengaged state (the non-L/U region) or in the engaged state (the L/U region) from the inputted vehicle speed VSP and the inputted accelerator opening degree APS, based on the characteristic view of FIG. 4. When the lockup clutch is in the engaged state (the L/U region), a value of the accelerator opening degree APS on a boundary line L1 of the region of FIG. 4 which corresponds to the vehicle speed VSP inputted from the vehicle speed sensor is determined as an accelerator opening degree threshold value APSa1 for the increase of the depression force. For example, when the vehicle speed is VSP1, the corresponding accelerator opening degree APSa1 becomes the accelerator opening degree threshold value for the increase of the depression force of the accelerator pedal 2, as shown in the drawing. Moreover, the control unit 10 sets an increase amount cancel threshold value APSa1' as an accelerator opening degree which is smaller than this accelerator opening degree threshold value APSa1 by a predetermined opening degree. This increase amount cancel threshold value APSa1' is the threshold value of the accelerator opening degree for canceling, that is, decreasing the predetermined increase amount of the depression force which is increased once at the accelerator opening degree threshold value APSa1. When the accelerator opening degree becomes equal to or smaller than this increase amount cancel threshold value APSa1', the above-described depression force increase amount is canceled. For example, this increase amount cancel threshold value is set as the value having the constant opening degree difference with respect to the accelerator opening degree threshold value APSa1. Alternatively, this increase amount cancel threshold value can be calculated by multiplying the accelerator opening degree threshold value APSa1 by a constant coefficient. However, the method of obtaining the increase amount cancel threshold value is not limited to these methods.

Figure 5:
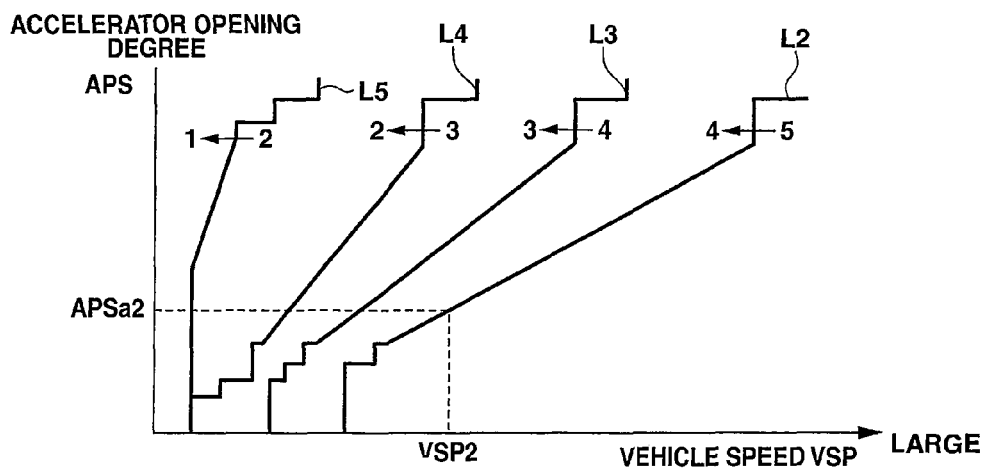
FIG. 5 is an explanatory view showing one example of correlation between the accelerator opening degree threshold value and a shift line of an automatic transmission.

Moreover, as shown in FIG. 5, the accelerator opening degree threshold value can be set to correspond to a downshift of the automatic transmission (the automatic shift to a low shift stage).

FIG. 5 shows, as one example, a shift diagram of a five-speed automatic transmission. As shown in the drawing, the shift control is performed based on the vehicle speed VSP and the accelerator opening degree APS. However, in general, the fuel consumption rate is low in the high shift stage. Accordingly, in this case, a shift line L2 from the fifth speed to the fourth speed is considered as a boundary line at which the fuel consumption rate is switched from the relatively low region to the relatively high region. Therefore, a value of the accelerator opening degree on this boundary line L2 which corresponds to the vehicle speed VSP (for example, VSP2) at that time becomes an accelerator opening degree threshold value APSa2. Besides, similarly, the accelerator opening degree threshold values may be set with respect to shift lines L3-L5 of the other shift stages. The increase amount cancel threshold value for canceling, that is, decreasing the predetermined increase amount of the depression force which is increased once at the accelerator opening degree threshold value APSa2, is set in the same manner as the increase amount cancel threshold value which is set to correspond to the engagement and the disengagement of the lockup clutch (not shown) in the automatic transmission of the torque converter type.

Besides, the accelerator opening degree threshold value can be set to correspond to a fuel increasing region on the high load side of the engine, in addition to the above-described method. The accelerator opening degree threshold value can be set by the characteristic of the fuel economy of the engine.

Moreover, the transmission may be, for example, a continuously-variable transmission in which the transmission gear ratio is continuously varied, or a manual transmission. In the case of the continuously-variable transmission, it is possible to calculate the transmission gear ratio as the ratio between the rotational speed of the input shaft side and the rotational speed of the output shaft side.

The control unit 10 outputs a depression force increase command to the actuator 9 when the accelerator opening degree becomes greater than the above-described accelerator opening degree threshold value when the driver depresses the accelerator pedal. The actuator 9 is actuated based on this depression force increase command, so that the depression force of the accelerator pedal 2 is increased to be more than the base depression force.

Figure 6:
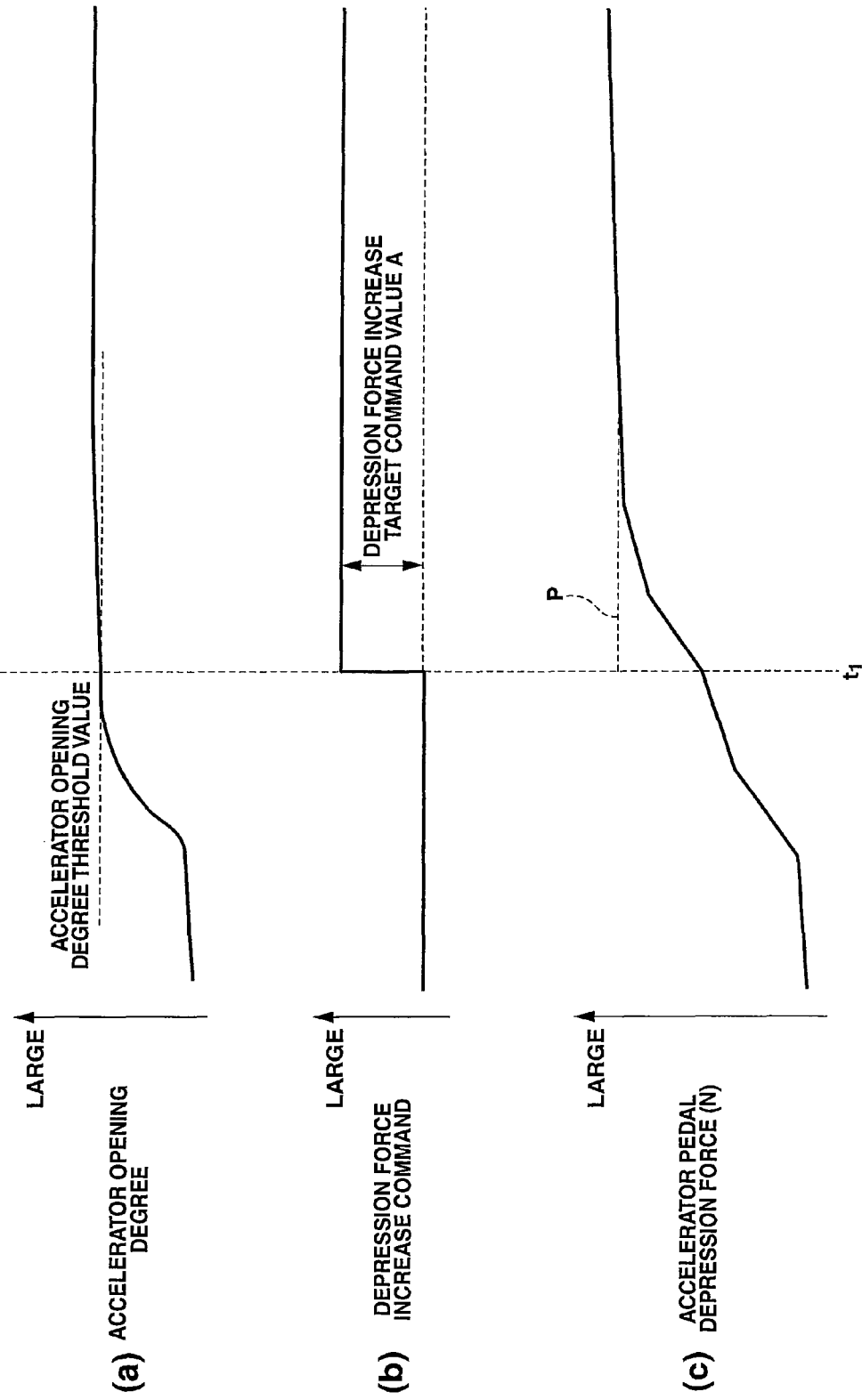
FIGS. 6(*a*)-6(*c*) show a timing chart showing variations of various parameters when the depression force of the accelerator pedal is increased to be more than the base depression force in a comparative example.

In some cases, the depression force increase command outputted from the control unit 10 to the actuator 9 when the accelerator opening degree becomes greater than the accelerator opening degree threshold value is a depression force increase target command value A. The depression force increase target command value A increases the depression force of the accelerator pedal 2 by the above-described depression force increase amount with respect to the base depression force as shown in FIG. 6(*b*). In such cases, this depression force increase target command value A is outputted in a stepped manner from a timing t1 at which the accelerator opening degree becomes the accelerator opening degree threshold value. However, the depression force of the accelerator pedal 2 is increased by the above-described depression force increase amount with respect to the base depression force, at a timing which is retarded from t1, as shown by a solid line in FIG. 6(*c*). The depression force of the accelerator pedal 2 is not increased by the above-described depression force increase amount with respect to the base depression force immediately at the timing t1 as shown in a broken line P in FIG. 6(*c*). With this, it is more difficult for the driver to experience a wall feeling with respect to feeling the depression of the accelerator pedal 2. That is, there is room for improvement of the response to increase the actual depression force of the accelerator pedal 2 by the predetermined depression force increase amount with respect to the base depression force at the timing t1, at which the accelerator opening degree becomes greater than the accelerator opening degree threshold value. Additionally, a broken line P in FIG. 6(*c*) shows a case where the depression force of the accelerator pedal 2 is generated as instructed by the depression force increase command.

Figure 7:
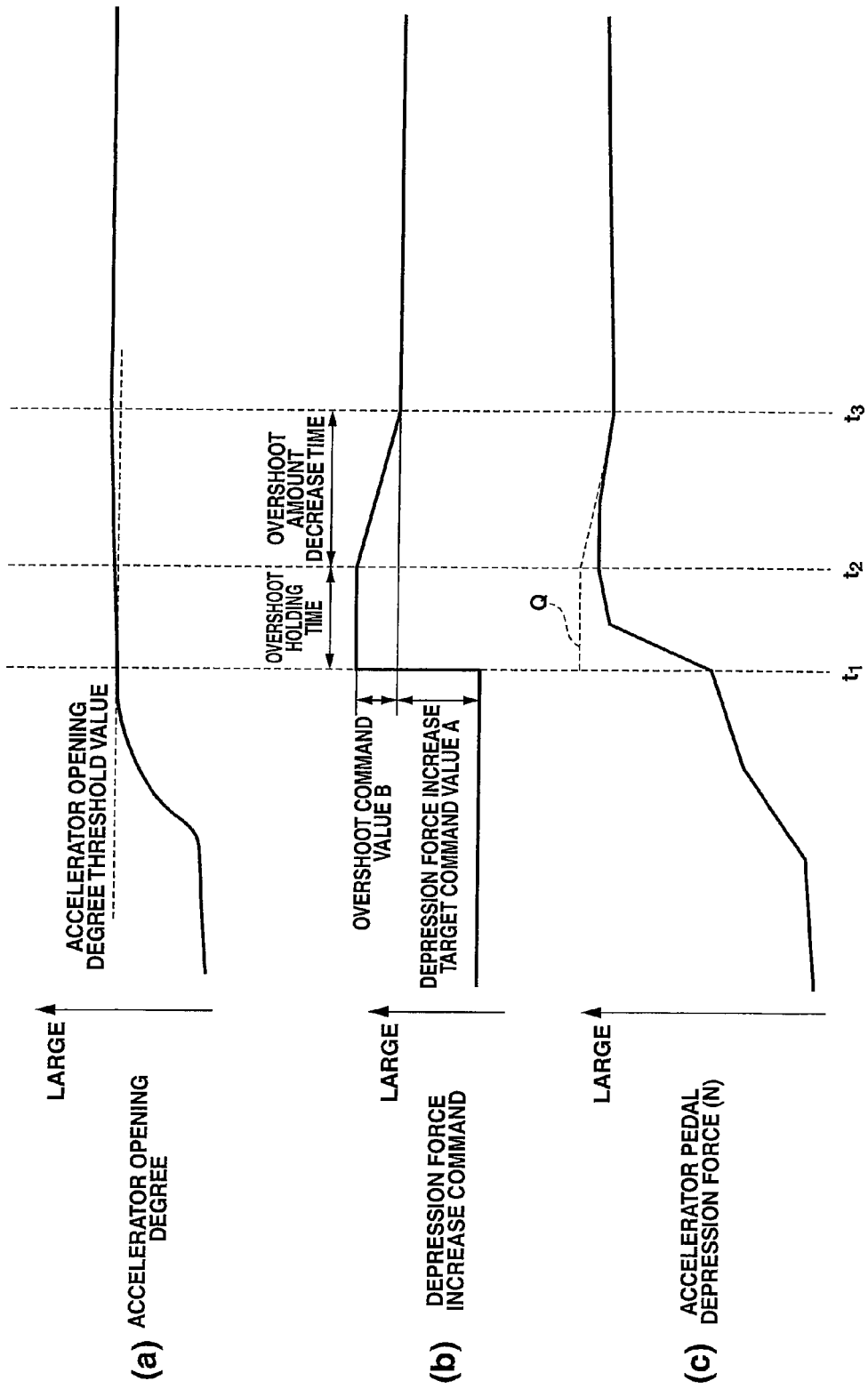
FIGS. 7(a)-7(c) show a timing chart showing variations of the various parameters when the depression force of the accelerator pedal is increased to be more than the base depression force in the one embodiment of the present invention.

Accordingly, in this embodiment, when the accelerator pedal opening degree becomes greater than the accelerator opening degree threshold value and the depression force of the accelerator pedal 2 is increased to be more than the base depression force (timing t1), an overshoot control is performed as shown in FIG. 7(*b*). In the overshoot control, the depression force increase command is once increased to be more than the depression force increase target command value A which is to increase the depression force of the accelerator pedal 2 to be more than the base depression force by the predetermined depression force increase amount, and then returned to the depression force increase target command value A.

The overshoot control in this embodiment uses, as overshoot controlled variables, an overshoot command value B which is an increase amount (overshoot amount) with respect to the depression force increase target command value A of the depression force increase command, and an overshoot holding time during which the depression force increase command is held to the state where the overshoot command value B is added to the depression force increase target command value A. These overshoot controlled variables are set based on the magnitude of the hysteresis of the base depression force of the accelerator pedal 2. The magnitude of the hysteresis of the base depression force of the accelerator pedal 2 is represented by unit such as [N] or [Kgf]. In this embodiment, the magnitude of the hysteresis of the base depression force of the accelerator pedal 2 is set in accordance with the types of the vehicles. That is, as shown in FIG. 3, the characteristic of the accelerator pedal depression force are set to be different in accordance with the type of the vehicle. The magnitude of the hysteresis of the base depression force of the accelerator pedal 2 is set so that vehicles of the same type have the same value, and so that the different types of the vehicles have the different values. That is, the magnitudes of the hysteresis of the base depression force of the accelerator pedal 2 are set to have the different values between the vehicles having the different characteristics of the accelerator pedal depression force of the employed accelerator pedal 2.

The overshoot command value B which is added to the depression force increase target command value A is gradually decreased over a predetermined overshoot command value decrease time from the timing t2 at which the overshoot holding time elapsed. The depression force increase command becomes the depression force increase target command A at a timing t3 at which the overshoot command value decrease time elapsed.

In this embodiment, at timing t1, the depression force increase command, which is larger than the depression force increase target command A for increasing the predetermined depression force increase amount with respect to the base depression force, is outputted. The depression force of the accelerator pedal 2 is immediately increased as shown in a solid line in FIG. 7(*c*), relative to a case where the depression force increase command of the depression force increase target command value A is outputted at the timing t1. That is, although the depression force of the accelerator pedal 2 is not immediately increased by the predetermined depression force increase amount with respect to the base depression force at the timing t1, the depression force of the accelerator pedal 2 is increased by the predetermined depression force increase amount with respect to the base depression force during a relatively short time from time t1. With this, the driver can readily experience the wall feeling with respect to feeling the depression of the accelerator pedal 2.

Moreover, the depression force increase command outputted at the timing t1 is a value obtained by adding the overshoot command value B to the depression force increase target command value A. Accordingly, when the overshoot command value B is extremely increased, the reaction becomes large, and the foot of the driver depressing the accelerator pedal 2 is returned, so that the operability is deteriorated. Moreover, the depression force of the accelerator pedal 2 is increased to be equal to or greater than the predetermined depression force increase amount corresponding to the depression force increase target command value A, in a state where the overshoot command value B remains to be added to the depression force increase target command value A. However, it is possible to suppress the overshoot of the increase amount of the depression force of the accelerator pedal 2 with respect to the predetermined depression force increase amount corresponding to the depression force increase target command value A. Such suppression can be achieved by appropriately setting the overshoot command value B and the overshoot holding time. A broken line Q in FIG. 7(*c*) represents a case where the depression force of the accelerator pedal 2 is generated as instructed by the depression force increase command.

That is, when the depression force of the accelerator pedal 2 is increased to be more than the base depression force, the overshoot command value B set based on the magnitude of the hysteresis of the base depression force of the accelerator pedal 2 is added to the depression force increase target command value A for increasing than the base depression force by the predetermined depression force increase amount. Moreover, a state where the overshoot command value B is added to the depression force increase target command value A is held during the overshoot holding time set based on the magnitude of the hysteresis of the base depression force of the accelerator pedal 2. With this, it is possible to improve the response to increase the depression force of the accelerator pedal 2 by the predetermined depression force increase amount with respect to the base depression force, with respect to the timing t1 at which the accelerator opening degree becomes greater than the accelerator opening degree threshold value. Furthermore, it is possible to prevent the deterioration of operability due to the excessive increase of the depression force of the accelerator pedal 2.

That is, when the depression force of the accelerator pedal 2 is increased to be more than the base depression force, the overshoot controlled variables are set based on the magnitude of the hysteresis of the base depression force of the accelerator pedal 2. Accordingly, it is possible to appropriately set the overshoot controlled variables, to improve the response of the increase of the depression force when the depression force of the accelerator pedal 2 is increased than the base depression force, and to prevent the deterioration of the operability of the accelerator pedal 2.

In a case where the base depression force of the accelerator pedal 2 has a hysteresis having different values in the opening degree increasing direction and in the opening degree decreasing direction of the accelerator opening degree, when the depression force of the accelerator pedal 2 is increased to be more than the base depression force, the foot of the driver depressing the accelerator pedal 2 can more easily be returned by that reaction force as the hysteresis is smaller.

Figure 8:
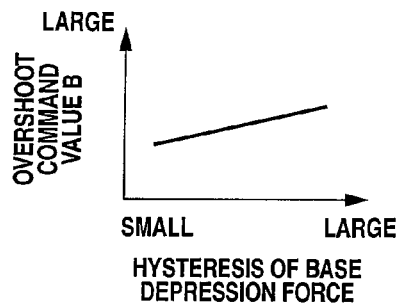
FIG. 8 is a characteristic view schematically showing a correlation between an overshoot command value B and a hysteresis.

Accordingly, as shown in FIG. 8, the overshoot command value B is set to be smaller as the hysteresis of the base depression force is smaller. That is, this embodiment has the hysteresis of the base depression force of the accelerator pedal 2 as shown in FIG. 3. The overshoot command value B is set by the magnitude of this hysteresis and the characteristic view shown in FIG. 8. Moreover, the vehicle may employ an accelerator pedal different from the characteristic shown in FIG. 3. Accordingly, when the magnitude of the hysteresis of the base depression force of the accelerator pedal 2 is different, the overshoot command value B is set by the magnitude of the hysteresis at that time, and the characteristic view of FIG. 8.

The foot of the driver depressing the accelerator pedal 2 can more easily be returned as the hysteresis becomes smaller at the overshoot control. Accordingly, it is possible to restrain the foot of the driver depressing the accelerator pedal 2 from returning, by decreasing the overshoot command value B.

Figure 9:
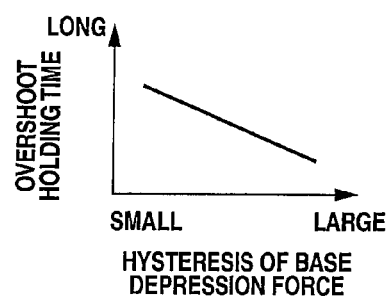
FIG. 9 is a characteristic view schematically showing a correlation between an overshoot holding time and the hysteresis of the base depression force.

As shown in FIG. 9, the overshoot holding time is set to be shorter as the hysteresis of the base depression force is larger. That is, this embodiment has the hysteresis of the base depression force of the accelerator pedal 2 as shown in FIG. 3. The overshoot holding time is set by the magnitude of this hysteresis, and the characteristic view shown in FIG. 9.

The foot of the driver depressing the accelerator pedal 2 is more difficult to be returned at the overshoot control as the hysteresis becomes larger. Accordingly, it becomes easy to hold the accelerator opening degree to the constant value even when the overshoot holding time is relatively small. The overshoot holding time corresponds to a time period when the foot of the driver depressing the accelerator pedal 2 adjusts to (become accustomed to) the depression force of the accelerator pedal 2, that is, a time period when the foot of the driver depressing the accelerator pedal 2 balances with the depression force of the accelerator pedal 2.

Moreover, the above-described overshoot controlled variables are set based on the magnitude of the depression force increase target command value A.

The driver can more easily experience the wall feeling associated with feeling the depression of the accelerator pedal 2 as the depression force of the accelerator pedal 2 is immediately increased. However, the foot of the driver depressing the accelerator pedal 2 can easily be returned.

Figure 10:
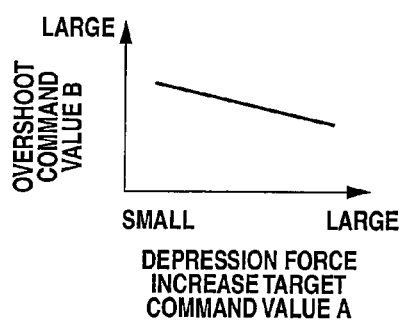
FIG. 10 is a characteristic view schematically showing a correlation between the overshoot command value B and a depression force increase target command value A.

Accordingly, the overshoot command value B is set to be smaller as the depression force increase target command A becomes larger, as shown in FIG. 10. That is, in this embodiment, when the accelerator opening degree becomes greater than the predetermined accelerator opening degree threshold value (APSa), the accelerator pedal depression force is increased by the predetermined amount with respect to the base depression force, as shown in FIG. 3. The overshoot command value B is set by the magnitude of the depression force increase target command value A for increasing by the predetermined amount, and the characteristic view shown in FIG. 10. Moreover, the vehicle may employ an accelerator pedal having a different predetermined amount for increasing the accelerator pedal depression force with respect to the base depression force. Accordingly, when the depression force increase target command value A for increasing by the predetermined amount is different, the overshoot command value B is set by the magnitude of the depression force increase target command value A at that time, and the characteristic view of FIG. 10.

When the depression force of the accelerator pedal 2 is increased to be more than the base depression force, the depression force that the foot of the driver depressing the accelerator pedal 2 feels becomes larger as the depression force increase target command value A is larger. With this, even when the overshoot command value B becomes smaller as the depression force increase target command value A is larger, it is possible to restrain the foot of the driver depressing the accelerator pedal 2 from returning, and to experience the wall feeling with respect to the feeling of depressing the accelerator pedal 2.

Figure 11:
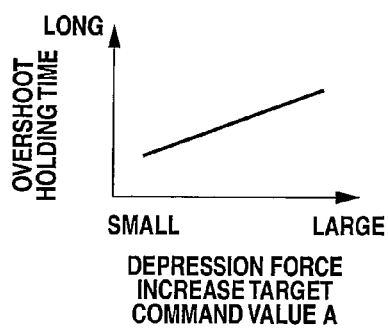
FIG. 11 is a characteristic view schematically showing a correlation between the overshoot holding time and the depression force increase target command value A.

As shown in FIG. 11, the overshoot holding time is set to be longer as the depression force increase target command value A becomes larger.

The depression force of the accelerator pedal 2 becomes larger as the depression force increase target command value A is larger. With this, the driver concentrates a large power on the foot depressing the accelerator pedal 2. Accordingly, time is needed for balancing the foot of the driver depressing the accelerator pedal 2 with the depression force of the accelerator pedal 2. Therefore, the overshoot holding time is set to be relatively longer as the depression force increase target command value A is larger. With this, it is possible to easily hold the accelerator opening degree to the constant value.

Besides, in the present invention, the predetermined depression force increase amount added in accordance with the base depression force, that is, the magnitude of the depression force increase target command value A, is held to the constant value. However, the predetermined depression force increase amount, that is, the magnitude of the depression force increase target command value A, may be varied in accordance with the driving state and so on of the vehicle. For example, the predetermined depression force increase amount (the depression force increase target command value A) may be set to be greater as the accelerator opening degree when the depression force is increased is greater. Moreover, the overshoot command value B or the overshoot holding time may be varied based on the varied magnitude of the depression force increase target command value A.

In this way, the overshoot controlled variables are set based on the hysteresis of the base depression force of the accelerator pedal 2 and the depression force increase target command value A. However, the return amount of the accelerator opening degree by the reaction force when the depression force of the accelerator pedal 2 is increased is different in accordance with the depression force, the depression position, and so on of the accelerator pedal 2 by the driver. Accordingly, the above-described overshoot controlled variables may be set in accordance with the return amount R of the accelerator opening degree at the overshoot control.

Figure 12:
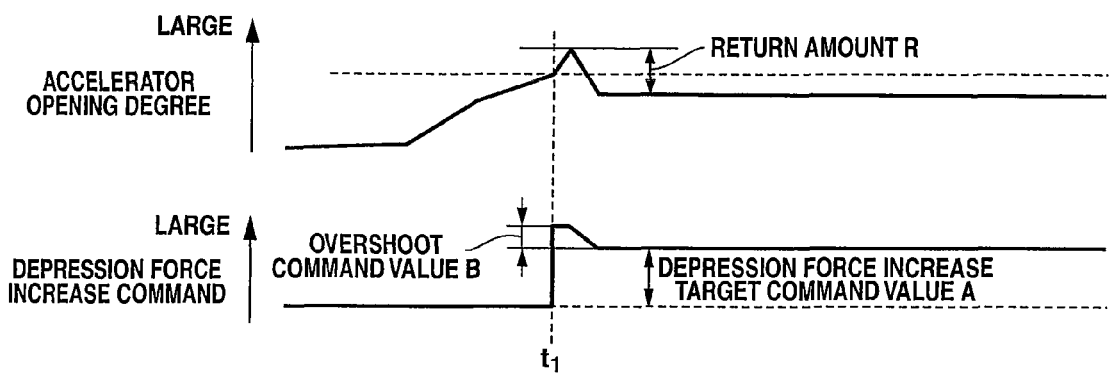
FIG. 12 is a timing chart showing a return amount R of the accelerator opening degree at the overshoot control, the accelerator opening degree, and the depression force increase command when the depression force of the accelerator pedal is increased to be more than the base depression force in the one embodiment of the present invention.

As illustrated in detail below by using FIG. 12, when the return amount R of the accelerator opening degree during the overshoot control, that is, the difference between the maximum value of the accelerator opening degree during the overshoot control and the accelerator opening degree at the completion of the overshoot control is large, the foot depressing the accelerator pedal 2 is returned during the overshoot control. Accordingly, the return amount R of the accelerator opening degree during the overshoot control is stored as a learning value. The overshoot controlled variables are varied so as to decrease the return amount R of the accelerator opening degree during the overshoot control based on this learning value at the next overshoot control.

With this, it is possible to set the wall feeling to correspond to the depression feeling of the accelerator pedal 2 while restraining the foot of the driver depressing the accelerator pedal 2 from returning at the overshoot control, irrespective of the individual difference of the depression force, the depression position and so on of the accelerator pedal 2 by the driver. Besides, the return amount R of the accelerator pedal 2 may be set to a continuous variation amount in the decreasing direction of the accelerator opening degree during a predetermined time period which is previously set from the timing t1 at which the accelerator opening degree becomes greater than the accelerator opening degree threshold value.

In a case where the overshoot command value B is varied in accordance with the magnitude of the return amount R of the accelerator opening degree, the overshoot command value B is set to be smaller as the return amount R of the accelerator opening degree is larger.

The foot of the driver depressing the accelerator pedal 2 is returned as the return amount R of the accelerator opening degree becomes larger. Accordingly, the overshot command value B is decreased as the return amount R of the accelerator opening degree becomes larger. With this, it is possible to restrain the foot of the driver depressing the accelerator pedal 2 from returning.

In a case where the overshoot holding time is varied in accordance with the magnitude of the return amount R of the accelerator opening degree, the overshoot holding time is set to be longer as the return amount R of the accelerator opening degree becomes larger.

The foot of the driver depressing the accelerator pedal 2 is returned as the return amount R of the accelerator opening degree becomes larger. Accordingly, time is needed for balancing the foot of the driver depressing the accelerator pedal 2 with the depression force of the accelerator pedal 2. Therefore, the overshoot holding time is lengthened as the return amount R of the accelerator opening degree becomes larger. With this, it is possible to easily hold the accelerator opening degree to the constant value.

Figure 13:
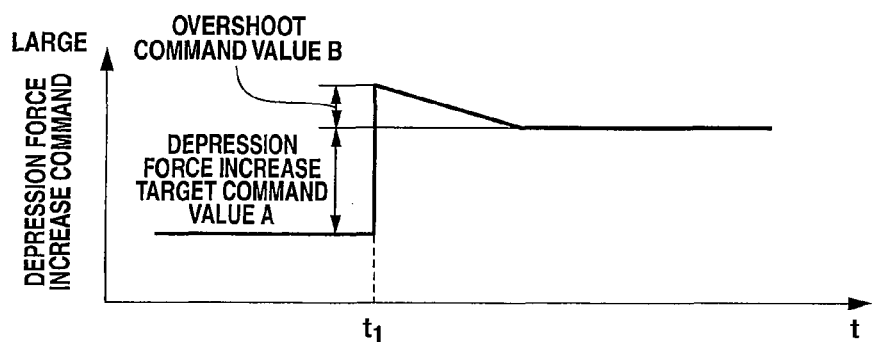
FIG. 13 is a timing chart showing a variation of the depression force increase command when the depression force of the accelerator pedal is increased to be more than the base depression force in another embodiment of the present invention.

Besides, in the above-described embodiment, the overshoot holding time is set in the overshoot control. However, it is possible not to set the overshoot holding time. That is, as shown in FIG. 13, the depression force increase command obtained by adding the overshoot command value B to the depression force increase target command value A may be outputted in the stepped manner at the timing t1 at which the accelerator opening degree becomes larger than the accelerator opening degree threshold value. Then, the overshoot command value B added to the depression force increase target command value A may be decreased after this timing t1. In this case, the only overshoot command value B is varied as the overshoot controlled variable.

Moreover, in the above-described embodiment, the hysteresis of the base depression force is set to the substantially constant value, irrespective of the magnitude of the accelerator opening degree. However, it is possible to apply the approach of this embodiment to other cases. For example, the approach can be applied to a case where the hysteresis of the base depression force is set to be larger as the accelerator opening degree becomes larger. The approach is also applicable to a case where the hysteresis of the base depression force is set to be smaller as the accelerator opening degree becomes larger.

The invention claimed is:

1. An accelerator pedal depression force setting method for an accelerator pedal depression force control device comprising:

sensing an accelerator opening degree using an accelerator opening degree sensor;

varying a depression force of an accelerator pedal using a depression force varying device, increasing, using the accelerator pedal depression force control device, the depression force of the accelerator pedal to be greater than a base depression force by a predetermined amount based on a depression force increase command which is sent to the depression force varying device when the accelerator opening degree becomes larger than a predetermined accelerator opening degree threshold value, performing an overshoot control to once increase the depression force increase command to be greater than a depression force increase target command value, which depression force increase target command value increases the depression force of the accelerator pedal to be greater than the base depression force by the predetermined amount when the depression force of the accelerator pedal is increased to be greater than the base depression force, and then to return to the depression force increase target command value, wherein the accelerator pedal depression force setting method further comprises:

controlling the base depression force of the accelerator pedal so as to have a hysteresis which has different values in an opening degree increase direction and in an opening degree decrease direction of the accelerator opening degree, and setting an overshoot controlled variable of the overshoot control based on the hysteresis.

2. The accelerator pedal depression force setting method for the accelerator pedal depression force control device as claimed in claim 1, further comprising:

varying, as the overshoot controlled variable, an overshoot amount of the depression force increase command with respect to the depression force increase target command value.

3. The accelerator pedal depression force setting method for the accelerator pedal depression force control device as claimed in claim 1, further comprising:

varying, as the overshoot controlled variable, an overshoot holding time during which the depression force increase command is held to a value greater than the depression force increase target command value.

4. The accelerator pedal depression force setting method for the accelerator pedal depression force control device as claimed in claim 2,
wherein the overshoot amount is increased as the hysteresis becomes larger.

5. The accelerator pedal depression force setting method for the accelerator pedal depression force control device as claimed in claim 3,
wherein the overshoot holding time is shortened as the hysteresis becomes larger.

6. The accelerator pedal depression force setting method for the accelerator pedal depression force control device as claimed in claim 1,
wherein the overshoot controlled variable is varied in accordance with the depression force increase target command value.

7. The accelerator pedal depression force setting method for the accelerator pedal depression force control device as claimed in claim 6,
wherein the overshoot amount is decreased as the depression force increase target command value becomes larger.

8. The accelerator pedal depression force setting method for the accelerator pedal depression force control device as claimed in claim 6,
wherein an overshoot holding time is lengthened as the depression force increase target command value becomes larger.

9. The accelerator pedal depression force setting method for the accelerator pedal depression force control device as claimed in claim 1,
wherein the overshoot controlled variable is varied in accordance with a return amount of the accelerator opening degree at the overshoot control.

10. The accelerator pedal depression force setting method for the accelerator pedal depression force control device as claimed in claim 9,
wherein the overshoot amount is decreased as the return amount of the accelerator opening degree becomes larger.

11. The accelerator pedal depression force setting method for the accelerator pedal depression force control device as claimed in claim 10,
wherein an overshoot holding time is lengthened as the return amount of the accelerator opening degree becomes larger.

* * * * *